United States Patent Office 3,803,088
Patented Apr. 9, 1974

3,803,088
THERMOSETTING POLYCYANATE RESIN
Thomas F. Gardeski, St. Paul, Minn., assignor to Minnesota Mining and Manufacturing Company, St. Paul, Minn.
No Drawing. Filed Apr. 12, 1972, Ser. No. 243,419
Int. Cl. C08g 17/02
U.S. Cl. 260—47 CZ        9 Claims

ABSTRACT OF THE DISCLOSURE

Polycaprolactone-modified diphenols are prepared by esterification of aromatic diphenol with caprolactone; the product mixture is reacted with cyanogen chloride to form cyanate-terminated, low-melting prepolymers which can be cured by heating, with or without catalyst, to form polycyanurates.

SPECIFICATION

This invention relates to modified polycyanurates and synthetic resin systems incorporating such polymers. More particularly, the invention relates to new polycaprolactone - modified aromatic diphenols and cyanate resins formed therefrom, which are storable, easily handled, low-melting prepolymeric mixtures that are curable by heating, through the cyclotrimerization of cyanate groups, to produce polycyanurate resins.

BACKGROUND OF THE INVENTION

Monomeric aromatic cyanates have been described in German Pat. 1,195,764, and high molecular weight, rigid polycyanurates and polytriazines have been obtained through the polytrimerization of aromatic di- and polyfunctional cyanates as described in German Pat. 1,190,-184. Such high molecular weight, rigid polycyanurates and polytriazines have also been described in U.S. Pat. 3,297,639 as prepared by the polycondensation of cyanuric chloride with bisphenols. These prior art polycyanurate resins, however, do not contain flexible aliphatic polyester groups and are generally characterized by a rigidity that limits their utility. Other useful cyanurate polymers are described in U.S. Pat. 3,595,900.

Modified polycyanurates have been described in German specifications DT 68–803,603 and DT 68–803,604, wherein esterlinked polyalkylene ether moieties are shown as joining two cyanatophenyl groups used as starting materials. See also U.S. Pat. 3,403,128, wherein aryl cyanates have been used as stabilizing agents for polyesters.

SUMMARY OF THE INVENTION

The present invention provides a new family of polycyanate resins which can be cured to polycyanurates having advantageous utility because of desirable physical properties, including high strength, toughness, somewhat elastomeric character and improved adhesive properties. The caprolactone-modified cyanate resins of the present invention have utility for producing polycyanurates for such fields as coatings, binders, sealants and structural adhesives. Particularly useful are metal sheets coated with the polymers of the invention. Also, for example, the resins of the present invention can be coated on a polyester or nylon web which is then cured and used as a backing for an abrasive adhered thereto.

These new curable cyanate resins, which have prolonged shelf life when stored in closed containers at low to moderate temperatures, can be used in their generally viscous liquid or wax-like form or can be melted for liquid application at relatively low temperatures. In addition, these new cyanate resins can also be blended with epoxy resins or other dicyanate resins to provide ultimate cured polymeric systems having increased flexibility.

The present invention contemplates the provision of a cyanate resin system that contains flexible, aliphatic ester groups which, when cured, provide polycyanurate resins with high strength and good flexibility.

It is also an aim of the present invention to provide a cyanate-type single-component resin system that does not evolve a volatile by-product during cure.

The present invention further aims to provide hydroxyterminated intermediates that are useful as oligomers of prepolymers for polyurethanes, polyesters and the like.

In preparing the curable cyanate resins according to the present invention a reaction sequence consisting essentially of two steps is employed. These steps may be characterized as initial preparation of a reaction mixture including ester-linked caprolactone-substituted aromatic diphenol, followed by preparation of a corresponding mixture of cyanate prepolymer. As a final step, the cyanate prepolymer is cured to form polycyanurate polymer.

The following series of formulae illustrates these steps. In these formulae, —Ar— signifies a residue derived from an aromatic diphenol by removal of the hydroxyl groups therefrom, including, for example, phenyl, diphenyl, naphthyl and

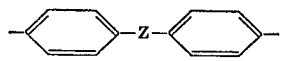

wherein Z is

wherein R and R' represent hydrogen or the same or different lower alkyl (i.e. alkyl having from 1 to 4 carbon atoms) or

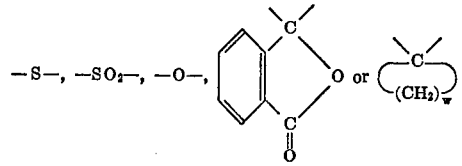

wherein $w$ is an integer from 2 to 6; $y$ represents 0.1 to 2 moles and $m$ and $x$ are the same or different integers from 1 to 20. Representative phenols having these structures are resorcinol, Bisphenol A, Bisphenol B (2,2-bis(4-hydroxyphenyl)butane), phenolphthalein, dihydroxy diphenyl ether, dihydroxy diphenyl sulfone, dihydroxy diphenyl sulfide, 1,1-di(4 - hydroxyphenyl)cycloalkane such as 1,1 - di(4 - hydroxyphenyl)cyclopropane, 1,1 - di(4-hydroxyphenyl)cyclohexane, and the like.

Step A.—Preparation of mixed diphenol and ester-linked, hydroxyl - terminated caprolactone derivative of diphenol

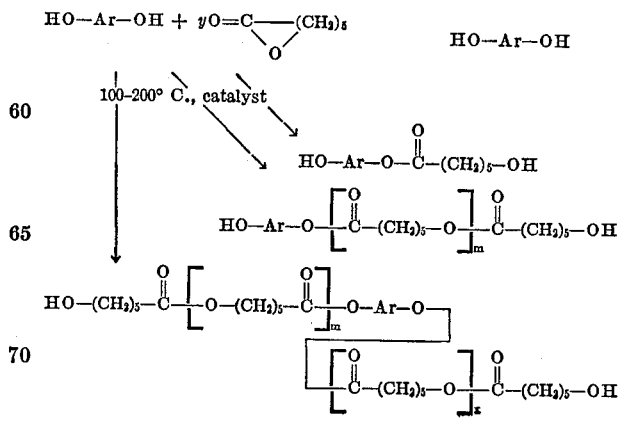

Step B.—Preparation of cyanate-terminated prepolymer mixture

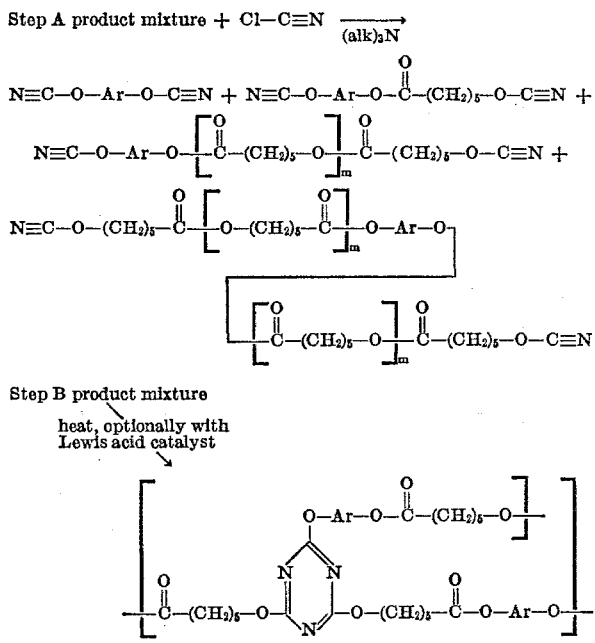

and other species.

It is to be understood that in the reaction of step A, several competing reactions take place so as to form polycaprolactone ester chains of varying lengths of from 1 to 20 units attached to one or both of the hydroxyl groups of the bisphenol. There generally also remains a greater or lesser quantity of unreacted bisphenol. The polycaprolactone chains are linked to the bisphenol moiety by ester linkages, and the proportions of each product, and chain lengths, are believed to be highly random. Nevertheless, the compounds formed are all terminated by two or more hydroxyl groups. These hydroxyl groups are converted, in step B, to cyanate groups without, so far as is known, changing the relative proportions or chain lengths of the hydroxyl-terminated products.

Although the exact composition of the mixtures produced in steps A and B would be difficult to elucidate, it has been found that, in the proportions used, the presence of the caprolactone residues linked to the bisphenol through ester linkages produces a highly useful mixture. In the case of the products of the first step, the hydroxyl-terminated molecules can be used for further polyester condensation as well as for producing the claimed cyanate prepolymer mixture. In the latter case, when cured, the caprolactone residues confer improved flexibility and toughness on the resulting polycyanurates.

In carrying out the first step of the above-depicted reaction sequence, each mole of the selected aromatic diphenol is reacted with about 0.1 to 2 moles of caprolactone in the presence of a catalyst, such as a metal-organic salt, e.g., stannous octoate, or an acid catalyst, preferably a strong acid catalyst such as sulfuric acid. The reaction is carried out by heating the reaction mixture at a temperature of between about 100° C. and 200° C. and preferably between 140° C. and 160° C., for a period of between two and five hours. When metal-organic salts are used as catalysts, shorter reaction times can be employed.

Broadly speaking, the bisphenols which are useful in the process of the invention to produce the hydroxyl-terminated reaction product, which is ultimately cyanated to form the claimed cyanate prepolymer resin system of the invention, are those disclosed in German Pat. 1,195,-764 and in U.S. Pats. 3,553,244 and 3,219,670. These are known for use as starting materials to be cyanated, and then to be converted to polycyanurate polymers as disclosed in German Pat. 1,190,184 and U.S. Pat. 3,595,900.

Because the esterification to modify the bisphenols leaves two terminal hydroxyl groups which can be cyanated on each of the reaction products of step A, any bisphenol capable of forming the corresponding dicyanate derivative, and which latter are ultimately polymerizable to polycyanurate polymers, all as described in the aforesaid patents, are suitable for use in the invention. These bisphenols are herein termed "cyanatable bisphenols."

Useful as catalysts for the preparation of the prepolymers according to the present invention are sulfuric acid, trifluoromethylsulfonic acid, trifluoroacetic acid, tolylsulfonic acid and the like, and stannous octoate, copper octoate and the like. The preferred catalysts are sulfuric acid and trifluoromethylsulfonic acid.

The catalyst is added to the reaction mixture in an amount of from about 40 to 90 mg. for each 100 grams of the combined caprolactone plus bisphenol present (i.e. from 4 to 9 parts catalyst per 10,000 parts of reaction mixture); the larger amounts being used for smaller lot sizes. The addition of catalyst is made incrementally with stirring to avoid decomposition. Preferably the course of the reaction is monitored by checking the infrared spectrum of aliquots and observing the decrease in aliphatic OH absorption at 9.6 microns as the reaction proceeds.

The end of the reaction is signalled by the production of a viscous liquid which does not show further increase in viscosity upon continued heating. However, if desired, the increase in viscosity can be followed with e.g. a Brookfield viscometer. The attainment of viscosity of 200,000 centipoises at room temperature (about 25° C.) is sufficient as a minimum.

Preferably, the reaction is run at a temperature of about 150° C. to form a polyester-substituted precursor product which is a clear, honey-like, homogeneous liquid.

In the second step of the reaction sequence, the reaction product of the first step, which consists of the above-described mixture of unchanged bisphenol and the polyester-substituted material, is dissolved in an inert organic solvent such as, for example, acetone, chloroform, carbon tetrachloride, tetrahydrofuran, dimethylformamide, dimethylacetamide, benzene and the like. The solution is cooled to $-10°$ to $-30°$ C., and then two moles (and preferably a slight excess, e.g. 2.1 moles) of cyanogen bromide or cyanogen chloride are added for each mole of bisphenol originally present. The preferred solvent is acetone, and the preferred cyanogen halide is cyanogen chloride.

To the mixture thus obtained is added, with stirring, an excess (e.g. 2.05 moles) of a strong base such as triethylamine, trimethylamine or other tri-lower alkylamine for each mole of bisphenol originally present. The preferred amine is trimethylamine. The addition is made incrementally, e.g. by bubbling in gaseous amines or adding liquid amines dropwise at the rate of about one to two drops per second, the temperature of the reaction vessel being maintained at between $-10°$ and $-30°$ C. The addition of base is adjusted so as to maintain an excess of cyanogen halide over the base at all times. After the addition of the trialkylamine has been completed, the reaction mixture is allowed to warm to room temperature for about 15 to 20 minutes. A suitable water-immiscible inert organic solvent is then added, and the mixture is stirred for about 15 to 20 minutes. Suitable water-immiscible inert organic solvents are those in which the final product is soluble, for example, lower alkylene halides such as methylene chloride, benzene, toluene and the like. The preferred solvent is methylene chloride.

The contents of the reaction vessel are then poured into cold water with vigorous stirring. The organic phase is separated, dried over anhydrous magnesium sulfate and then filtered. The solvent is removed under vacuum with mild heating to about 50° C. The cyanate prepolymer mixture thus obtained appears as a liquid that tends, upon standing at room temperature for several days, to form a wax-like solid or paste. This mixture can be stored at room temperature for extended periods before use.

The polyester-substituted cyanate prepolymers prepared as described above are cured to the cyanurate form by first melting the cyanate monomeric material to obtain a homogeneous melt and then raising the temperature in a range of 50 to 200° C., preferably 100 to 150° C. Alternatively, this polymerization can be carried out at lower temperatures, preferably 25 to 100° C., with the aid of activators, initiators or catalysts. These polymerization promoting agents representatively include Lewis acids, such as aluminum chloride, boron trifluoride, ferric chloride, titanium chloride and zinc chloride; protonic acids, such as hydrochloric and other mineral acids; salts of weak acids, such as sodium acetate, sodium cyanide, sodium cyanate, potassium thiocyanate, sodium bicarbonate, sodium boronate and phenylmercuric acetate; and bases, such as sodium methoxide, sodium hydroxide, pyridine, triethylamine and the like. Preferred catalysts are nonionic coordination compounds, such as copper, manganic and manganous acetyl acetonates; most preferred are manganic and manganous acetyl acetonates. The amount of catalyst used can vary, and generally will be 0.05 to 5 mole percent, preferably 0.05 to 0.5 mole percent.

The polymerization of the cyanates can also be carried out by polymerizing them in solution or in suspension, using as a solvent or suspension medium the common organic solvents such as hydrocarbons, ketones, halogenated hydrocarbons, nitrated hydrocarbons, dimethylsulfoxide, dimethylformamide or ether. The solvent can be removed by distillation or simple evaporation during the course of or at the end of the polymerization.

The cyanate-terminated prepolymers of the invention are generally thick, viscous liquids or amorphous, waxy solids which melt to flowable liquids at convenient working temperatures. They are soluble in a variety of organic solvents such as methylene chloride, chloroform, benzene, toluene, chlorobenzene, acetone, methyl ethyl ketone, ethylbenzoate, dimethylformamide and the like.

When 0.1 mole of caprolactone is used in the process of the invention for each mole of bisphenol, about 9% of the linking groups between repeating units in the final cyanurate polymers are ester linkages. When 2 moles of caprolactone are used, about 50% of the linking groups between repeating units in the polymeric product are ester groups. The remainder of the linking groups are cyanurate groups.

The following examples are illustrative of the resins according to the present invention, and their preparation.

EXAMPLE 1

Bisphenol A (22.8 g., 0.1 mole) and ε-caprolactone (22.8 g., 0.2 mole) are placed in an open beaker. Two drops (approximately 80 mgm.) of concentrated sulfuric acid are added, and the mixture is heated at 140° C. with moderate stirring for three hours. Upon cooling, a vacuum homogeneous liquid results.

EXAMPLE 2

The above mixture containing modified phenol is dissolved in 150 ml. of acetone, then cooled to −20° C. The cooled solution is added to 16 g. cyanogen chloride (at −20 to 30° C.) contained in a three-necked flask fitted with a stirrer and pressure equalizing addition funnel. To this solution is added dropwise, over 15 minutes, 22 g. of triethylamine, during which the flask is cooled to maintain the temperature at −10 to −20° C. The cooling bath is removed and stirring is continued for an additional 10 to 15 minutes. One hundred ml. of dichloromethane is added with vigorous stirring, and the contents of the flask are poured into 1500 ml. of cold water with vigorous stirring. The dichloromethane phase is separated and dried over magnesium sulfate. The dichloromethane is then removed under vacuum with slight heating (approximately 50° C.) to leave a honey-like, viscous and liquid cyanate. When this product is heated at 150° C. for two hours and 200° C. for one hour a very tough elastomer, having tensile strength 2800 p.s.i., elongation 80 percent at break, is formed.

EXAMPLE 3

Two grams of the above cyanate and 3 g. of Shell Epon 878 are mixed with heating to about 50° C. A clear, homogeneous mixture is obtained which upon further heating at approximately 175° C. for several hours cures to a clear, tough, flexible plastic.

EXAMPLE 4

100 gms. of ε-caprolactone and 100 grams of Bisphenol A are weighed out, placed in a glass beaker and mixed with a glass stirring rod at room temperature for one or two minutes. To this mixture is added 80 mg. (approximately two drops) of concentrated sulfuric acid and stirring is continued while heating until the mixture is homogeneous. At this point, the temperature is generally about 100° C. A further quality of 40 mg. (approximately one drop) of concentrated sulfuric acid is added and stirring is continued using a mechanical stirrer while heating to 155° C. The temperature is held at this point, while heating is continued. Small aliquots are removed from the mixture at fifteen minute intervals and the infrared spectrum of each is observed. The absorption peak at 9.6 microns, which is believed to represent aliphatic hydroxyl, begins to decrease as reaction proceeds. If a decrease does not take place after approximately 30 to 45 minutes, another increment of 40 mg. of concentrated sulfuric acid is added to the reaction mixture while continuing heating. If a definite decrease in the absorption peak at 9.6 microns, i.e., consumption of aliphatic hydroxyl, does not take place, the reaction is not proceeding properly. After heating has continued at 150° C. for about two hours to two hours and twenty minutes, a color change in the reaction mixture, from light pink to light yellow, is ordinarily observed. After this color change takes place, heating is continued for an additional period of about 40 minutes, then the reaction mixture is permitted to cool to room temperature.

The reaction mixture thus obtained, consisting of unchanged bisphenol and various derivatives thereof with caprolactone as set forth hereinabove, is then dissolved in 600 ml. of acetone and the solution is cooled to −15° C. The cold solution is added to 64 gms. of cyanogen chloride cooled to −20° to −30° C. and contained in a three-necked flask equipped with a stirrer and pressure equalizing addition funnel. 90 gms. of triethylamine are placed in the funnel and added dropwise to the solution at the rate of about 1–2 drops per second, while holding the contents of the flask at −10° to −20° C. After the addition of the triethylamine is completed, cooling is discontinued and the flask contents are stirred at room temperature for about 20 minutes. Thereafter, 550 ml. of dichloromethane are added and stirring is continued for 10 minutes. The contents of the flask are then poured into approximately 5 liters of a mixture of ice and water with vigorous stirring. The organic phase is separated from the mixture, dried over anhydrous magnesium sulfate, and filtered. The dichloromethane is removed by heating at about 50° C. under reduced pressure. Conveniently, a rotating evaporative device is employed. The cyanated prepolymer thus obtained is a pale yellow, viscous, honey-like liquid. After standing about two to three days at room temperature, the liquid becomes a waxy solid. This prepolymer can be stored at temperatures in the range of about 0° to 25° C. for extended periods, without deterioration and retaining its curable properties. Samples of such polymer have been kept for as long as three years, and then cured by heating with catalysts, as described herein.

EXAMPLE 5

Following the procedure of Examples 1 and 2, with 22 g. (0.1 mole) of resorcinol in place of the bisphenol A, a cyanate is obtained which when cured under the conditions set forth in that example shows a tensile strength of 3700 p.s.i. and 25 percent elongation at break.

EXAMPLE 6

Eleven grams of the cyanate prepolymer of Example 2 and 11 g. of bisphenol A dicyanate are mixed with gentle heating until melted. A clear, homogeneous mixture is obtained which upon further heating for 3 hours at 150 to 200° C. cures to a clear, tough, flexible plastic. This cured material has a tensile strength of 9000 p.s.i. and 10 percent elongation at break at room temperature, and a tensile strength of 2200 p.s.i. with 35 percent elongation at break at 150° C.

EXAMPLE 7

Twenty-three grams of the 50 percent lactone-modified bisphenol A cyanate as prepared in Examples 1 and 2, are placed in a test tube which is submerged in an oil bath at 100° C. A Brookfield viscometer is used to measure the viscosity (using the spindle as a stirrer) until a value of 700 cps. is obtained after five hours. The advanced material is quickly cooled to room temperature. One hundred and fifteen milligrams of ferric acetylacetonate (0.5 weight percent) in 2.4 ml. of acetone are added and mixed thoroughly into the advanced cyanate. This solution is brush-coated onto both splice surfaces of drills cloth. After a pre-dry of 30 to 40 minutes at 95° C. the coated surfaces are placed together in a press, held at 170° C. for five seconds at contact pressure, then for 15 seconds at 6 tons pressure. T-peel values of 7.8 to 11.1 lbs./inch are obtained.

EXAMPLE 8

One gram of 50 percent caprolactone-modified bisphenol A cyanate containing 0.05 mole percent of manganous acetyl acetonate is brush-coated on both sides of a 9" x ¼" x 1 mil strip of Permalloy (nickel-ion alloy) foil and cured by heating the coated material for twenty minutes at 150–175° C. After cure, the foil can be subjected to a 180° bend and returned to its original position without cracking of the coating or creasing of the foil. The characteristic feature that the coated foil is not creased in bending is highly useful. The coated foil is thus suitable for use in applications where the Permalloy is to be subjected to flexing and requires a protective coating.

Similar results are obtained when sheets or foil of aluminum or other metals are coated as above; tough, adherent coatings being obtained.

EXAMPLE 9

To a clean 20 liter glass-lined kettle equipped with a heating jacket were added 7.73 kg. of freshly distilled ε-caprolactone and 7.73 kg. of p-bisphenol A. The mixture was stirred for about 15 minutes at room temperature, and then 3.5 gm. of concentrated sulfuric acid were added dropwise while beginning heating by introducing 80 p.s.i.g. (560 gm./cm.$^2$) steam into the heating jacket. The mixture was heated with stirring for about one-half hour to 105° C., and then a further amount of 3.5 g. of concentrated sulfuric acid was added dropwise. The solution appeared to be homogeneous at this point. The temperature was then raised to 155° C. and held there for 5.5 hours. The viscosity of the mixture was measured at convenient intervals and was found to be continually increasing up to the 5.5 hour mark. The mixture was cooled overnight under nitrogen, to about room temperature. The mixture was then reheated to 150° C., and the pressure in the kettle was reduced to about 30 mm. Hg. In this way, the volatile components consisting largely of caprolactone and bisphenol A were removed. The reduced pressure was maintained on the kettle for about 1.5 hours at the temperature noted, during which time the viscosity of the mixture advanced from 104,000 cps. at 25° C. to 220,000 cps.

Thereafter, the mixture was cooled to 20° C., and 9.4 liters of dry acetone were added under nitrogen. This solution was transferred to a clean 75 liter stainless steel kettle equipped with an external cooling system with −50° C. capability. 6.82 kg. of the prepolymer as prepared above were used, and sufficient dry acetone was added to make a total of 19 kg. (24 liters) of acetone. To this solution were added, under nitrogen, 2.36 kg. of cyanogen chloride, and the contents of the kettle were cooled to −17° C. Incremental addition of 2.05 kg. of trimethylamine was then begun, and addition was continued at such a rate that the temperature of the kettle contents was maintained between −15 and −10° C. The addition required about 45 minutes. Thereafter, the batch was maintained at −10° C. for about one hour. To this was added with stirring about 15 liters of dichloromethane, and then the batch was drained into about 40 liters of a mixture of crushed ice and water, with gentle stirring. The upper phase (water) was then decanted, and the lower organic layer was washed with cold water with gentle stirring for about 20 minutes. Most of the water layer was decanted off, and the remainer of the batch was placed in a separatory funnel. The lower organic layer was drained off into a vessel containing about 1.1 kg. of anhydrous magnesium sulfate, with stirring. After stirring for about 10 minutes, the resulting slurry was filtered, and the solvent was removed by distillation under vacuum, with gentle heating. The product was a syrupy, golden brownish liquid which crystallized slowly upon standing, but could be reliquified by heating to 40° C.

The prepolymer thus prepared could be cured by heating at about 175° C. for two hours. A three-gram portion of the material thus cured was a flexible, clear, slightly yellowish to red colored plastic material with tensile and elongation properties similar to the material made in Example 2, having tensile strength of about 2800 p.s.i. (197 kg./cm.$^2$) and elongation at break of about 80 percent.

What is claimed is:

1. Soluble, fusible, curable polycyanate group-containing prepolymer suitable for heat-curing to a polycyanurate polymer consisting essentially of the mixture from reaction of cyanatable bisphenol with from about 0.1 to 2 moles of caprolactone per mole of bisphenol by heating a mixture thereof at a temperature of 100 to 200° C. in the presence of 4 to 9 parts of an esterification catalyst of the group consisting of stannous octoate, copper octoate and strong acid for each 10,000 parts of reaction mixture, the caprolactone moiety as such and chains comprising repeating units containing said moiety being linked to the said bisphenol by ester linkages, and treating the resulting product in admixture with the equivalent amount of cyanogen chloride or bromide in inert solvent solution at a temperature of from about −10 to −30° C. with a strong base, all non-esterified hydroxyl groups of said reaction mixture being replaced by cyanate groups.

2. Reaction mixture consisting essentially of cyanatable bisphenol modified with from about 0.1 to 2 moles of caprolactone for each mole of bisphenol by heating the said mixture at a temperature of 100 to 200° C. in the presence of 4 to 9 parts of an esterification catalyst of the group consisting of stannous octoate, copper octoate and strong acids for each 10,000 parts of said reaction mixture, the caprolactone moiety and chain repeating units containing such moiety being linked to the said bisphenol by ester linkages, said reaction mixture containing two terminal hydroxyl groups for each bisphenol molecule originally present.

3. Polycyanurate polymer consisting essentially of the polymer prepared by heating to a temperature in the range of 50 to 200° C. the prepolymer of claim 1.

4. Process for preparing curable polycyanate-resin systems which comprises reacting from 0.1 to 2 moles of caprolactone with one mole of cyanatable bisphenol by heating a mixture thereof at a temperature of 100 to 200° C. in the presence of about 4 to 9 parts of esterification catalyst of the group consisting of stannous octoate, copper octoate and strong acids for each 10,000 parts of reaction mixture, and treating the resulting product in admixture with the equivalent amount of cyanogen chloride or bromide in inert solvent solution, at a temperature of from about −10 to −30° C., with a strong base.

5. Metal sheet coated with polymer according to claim 3.

6. Coated metal sheet according to claim 5, in which the metal is an iron alloy.

7. Coated metal sheet according to claim 5, in which the metal is in the form of a thin foil.

8. Prepolymers according to claim 1, wherein the cyanatable bisphenol has the formula HO—Ar—OH wherein —Ar— represents

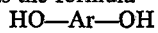 , 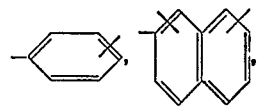 ,

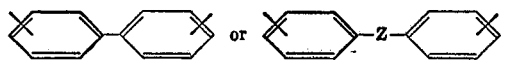

wherein Z represents

−S−, −SO$_2$−, −O−,

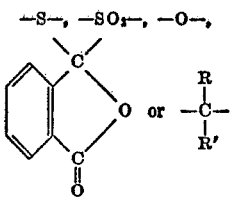 or $-\overset{R}{\underset{R'}{\overset{|}{C}}}-$ wherein R and R' represent hydrogen or lower alkyl, or

wherein $w$ is an integer from 2 to 6.

9. Prepolymers according to claim 1, wherein the bisphenol is 4,4'-isopropylidenediphenol.

References Cited
UNITED STATES PATENTS

| | | | |
|---|---|---|---|
| 3,523,101 | 8/1970 | Reuter | 260—47 |
| 3,642,725 | 2/1972 | Schminke et al. | 260—78.4 |
| 3,658,756 | 4/1972 | Rueter | 260—47 |

LESTER L. LEE, Primary Examiner

U.S. Cl. X.R.

117—132 B, 138.8 F, 138.8 N; 260—31.2 N, 32.6 N, 32.8 N, 33.6 R, 33.8 R, 49, 78.4 N, 830 R

UNITED STATES PATENT OFFICE
CERTIFICATE OF CORRECTION

Patent No. 3,803,088  Dated April 9, 1974

Inventor(s) Thomas F. Gardeski

It is certified that error appears in the above-identified patent and that said Letters Patent are hereby corrected as shown below:

Column 2, line 11, "of" should read --or--.

Column 2, line 45, following "Bisphenol B" there should be inserted a comma (,).

Column 3, line 18, before "Step B product mixture" there should be inserted --Step C - Curing of cyanate-terminated prepolymer from Step B to form polycaprolactone-modified polycyanurate polymer.--.

Column 6, line 35, "150° C." should read --155° C.--.

Signed and sealed this 3rd day of December 1974.

(SEAL)
Attest:

McCOY M. GIBSON JR.
Attesting Officer

C. MARSHALL DANN
Commissioner of Patents